US007427387B2

(12) United States Patent
Katsuro et al.

(10) Patent No.: US 7,427,387 B2
(45) Date of Patent: *Sep. 23, 2008

(54) HIGH-PURITY QUARTZ POWDER, PROCESS FOR PRODUCING THE SAME, AND GLASS MOLDING

(75) Inventors: Yoshio Katsuro, Tokyo (JP); Keiji Yamahara, Kanagawa (JP); Takashi Yamaguchi, Fukuoka (JP); Yutaka Mori, Fukuoka (JP)

(73) Assignee: Mitsubishi Chemical Corporation, Tokyo (JP)

( * ) Notice: Subject to any disclaimer, the term of this patent is extended or adjusted under 35 U.S.C. 154(b) by 93 days.

This patent is subject to a terminal disclaimer.

(21) Appl. No.: 11/405,584

(22) Filed: Apr. 18, 2006

(65) Prior Publication Data
US 2006/0183624 A1     Aug. 17, 2006

Related U.S. Application Data

(63) Continuation of application No. 10/758,395, filed on Jan. 16, 2004, now Pat. No. 7,063,826, which is a continuation of application No. PCT/JP02/07322, filed on Jul. 18, 2002.

(30) Foreign Application Priority Data

Jul. 19, 2001    (JP)    ............................. P2001-218997

(51) Int. Cl.
*C01B 33/12*    (2006.01)
*C01B 33/18*    (2006.01)
*C01B 33/157*   (2006.01)
*C01B 33/158*   (2006.01)
*C03C 3/06*     (2006.01)
*C08K 3/36*     (2006.01)

(52) U.S. Cl. .................. 423/338; 423/335; 501/12; 501/54; 501/133; 501/154; 106/287.34; 65/17.2; 65/17.3

(58) Field of Classification Search ................. 423/335, 423/338; 501/54, 133, 154; 65/17.2, 17.3; 106/287.34
See application file for complete search history.

(56) References Cited

U.S. PATENT DOCUMENTS

| 5,211,733 | A | * | 5/1993 | Fukao et al. .................. 65/395 |
| 5,516,350 | A |   | 5/1996 | Onoda et al. |
| 6,110,852 | A |   | 8/2000 | Katsuro et al. |
| 6,129,899 | A |   | 10/2000 | Katsuro et al. |
| 7,063,826 | B2 | * | 6/2006 | Katsuro et al. .............. 423/335 |
| 2002/0017114 | A1 |   | 2/2002 | Fukui et al. |

FOREIGN PATENT DOCUMENTS

| EP | 629580 A | * | 12/1994 |
| JP | 59-9497 |   | 3/1984 |
| JP | 2-289416 |   | 11/1990 |
| JP | 4-154613 |   | 5/1992 |
| JP | 4-342412 |   | 11/1992 |
| JP | 5-17122 |   | 1/1993 |
| JP | 7-2513 |   | 1/1995 |
| JP | 7-206422 |   | 8/1995 |
| JP | 8-183621 A | * | 7/1996 |
| JP | 11-139835 |   | 5/1999 |
| JP | 2001-261353 |   | 9/2001 |

OTHER PUBLICATIONS

Machine Translation of Japanese Patent Specification No. JP8-183621A (Jul. 1996).*
Richard J. Lewis, Sr., Hawley's Condensed Chemical Dictionary, Twelfth Edition, Van Nostrand Reinhold Company, New York, 1993, p. 28, no month.

* cited by examiner

*Primary Examiner*—Anthony J Green
(74) *Attorney, Agent, or Firm*—Oblon, Spivak, McClelland, Maier & Neustadt, P.C.

(57) ABSTRACT

Subjects for the invention are to obtain a quartz powder having a high purity and high quality and a process for producing the same and to obtain a glass molding formed by melting and molding the powder and extremely reduced in bubble inclusion.

The invention provides a quartz powder, preferably a synthetic quartz powder obtained by the sol-gel method, which, upon heating from room temperature to 1,700° C., generates gases in which the amount of CO is 300 nl/g or smaller and the amount of $CO_2$ is 30 nl/g or smaller.

16 Claims, 1 Drawing Sheet

HIGH-PURITY QUARTZ POWDER, PROCESS FOR PRODUCING THE SAME, AND GLASS MOLDING

CROSS REFERENCES TO RELATED APPLICATIONS

This application is a continuation of U.S. patent application Ser. No. 10/758,395, filed on Jan. 16, 2004, now U.S. Pat. Ser. No. 7,063,826, which was a continuation of International Patent Application No. PCT/JP02/07322, filed on Jul. 18, 2002, and claims priority to Japanese Patent Application No. P2001-218997, filed on Jul. 19, 2001.

TECHNICAL FIELD

The present invention relates to a quartz powder having a high purity and high quality, a process for producing the same, and a glass molding formed by melting and molding the powder and extremely reduced in bubble inclusion.

BACKGROUND

In recent years, glass products for use in the field of optical communication, semiconductor industry, and the like are required to have exceedingly high quality. The purities thereof are strictly regulated. Such high-purity glasses are mainly produced by the known method (1) in which a sandy natural quartz powder obtained by pulverizing natural quartz (this powder is generally called "sand") is used as a raw material. Methods usable in the case where a glass having a higher purity is desired include: (2) the oxyhydrogen flame method which comprises decomposing silicon tetrachloride in an oxyhydrogen flame, depositing the resultant fume on a substrate to grow a fume deposit, and using this fume deposit as a raw material; and (3) a method in which a synthetic quartz powder obtained by the so-called sol-gel method from a gel formed from an organometallic compound such as, e.g., a metal alkoxide, is used as a raw material.

However, those methods each have had both merits and demerits. For example, in the method (1), since a natural quartz powder, which intrinsically contains metallic elements such as aluminum and iron in the quartz particles, is used as a raw material, it is difficult to obtain a quartz powder product highly purified to such a degree as to have a metal impurity content of 100 ppb or lower even when a purification operation, e.g., pickling, is repeated. In the method (2), production at a commercially acceptable low cost is difficult, although a high purity can be attained. This method hence has not come to be used for mass-production.

In the sol-gel method (3), on the other hand, there has been a drawback that the raw materials, intermediate, and product necessarily contact with the production apparatus and impurities come into these due to contacts with the apparatus, although the product can be mass-produced. In particular, the particles (sol or gel) and wet gel yielded by reactions of the organometallic compound as a raw material with an alkoxide and water come into contact with the inner wall of the apparatus and repeatedly undergo deposition, peeling, and shedding, during which abnormal particles (scaling debris) come into the product. Examples of the apparatus in which such scaling debris generate include a series of synthetic-quartz production apparatus and individual devices for these which each have a part coming into contact with at least the reaction liquid, wet gel, or dry gel. Specific examples thereof include the reactor, pulverizer, dryer, piping, and the like. It has been extremely difficult to separate and remove the scaling debris from the product.

When the gel is burned to produce a synthetic quartz powder, such scaling debris change into carbon ingredients. The carbon ingredients aggregate to form black contaminant particles in the product. It has further been known that when the synthetic quartz powder is melted in forming a glass molding, the carbon ingredients decompose into gases and these gases form bubbles in the glass molding and thereby significantly impair the quality of the glass molding.

An example of known methods for eliminating the problem described above is to regulate a synthetic quartz powder obtained by a sol-gel reaction so that the number of black particles present in the powder is reduced to 5 or smaller per 50 g (JP-A-8-188411). In this patent document, there also is a statement to the effect that the glass molding obtained from a melt of this synthetic quartz powder is more reduced in bubble inclusion than those obtained by related-art techniques.

However, the quality requirements which the glass products for use in the field of optical communication, semiconductor industry, and the like are required to satisfy are becoming severer. There has hence been a desire for the development of a synthetic quartz powder which is effective in inhibiting bubble inclusion to a level lower than that attained with such a related-art technique.

Another method is known for heightening the purity of a synthetic quartz powder produced by the sol-gel method. This method comprises sufficiently supplying air in a burning step in order to reduce the amount of the scaling debris which are thought to have come into the powder due to contacts with the production apparatus and which may come into the product and to prevent the scaling debris which have come into the powder from remaining as unburned carbon. It has been known that this technique is effective in obtaining a glass molding reduced in bubble inclusion. However, even this technique cannot satisfy recent requirements for a higher purity, and there has been a desire for a synthetic quartz powder effective in inhibiting bubble inclusion in a high degree. A method in which heat treatment is conducted under vacuum has also been proposed. However, this method has had a problem that industrial use thereof is difficult, for example, because to industrially realize vacuum conditions necessitates a high cost.

DISCLOSURE OF THE INVENTION

The present inventors made intensive investigations in order to eliminate the problems described above. As a result, they have found that when a quartz powder, in particular a synthetic quartz powder produced by a sol-gel reaction, is one which, upon heating from room temperature to 1,700° C., generates gases in which the amount of CO is 300 nl/g or smaller and the amount of $CO_2$ is 30 nl/g or smaller, then this quartz powder is the desired quartz powder having a high purity. They have further found that a glass molding extremely reduced in bubble inclusion can be obtained from a melt of this quartz powder.

Furthermore, it has been found that this quartz powder is obtained as a synthetic quartz powder by hydrolyzing an alkoxysilane to obtain a silica gel having an average particle diameter of from 10 to 500 μm and bringing the silica gel into contact with helium and/or hydrogen gas at a temperature of from 400° C. to 1,300° C. The invention has been thus completed.

An essential point of the invention resides in a quartz powder which, upon heating from room temperature to 1,700° C., generates gases in which the amount of CO is 300 nl/g or smaller and the amount of $CO_2$ is 30 nl/g or smaller.

Another essential point of the invention resides in a process for producing a synthetic quartz powder which comprises hydrolyzing an alkoxysilane to obtain a silica gel having an average particle diameter of from 10 to 500 μm and bringing the silica gel into contact with helium and/or hydrogen gas at a temperature of from 400° C. to 1,300° C.

A still other essential point of the invention resides in a glass molding obtained by melting and molding a quartz powder which, upon heating from room temperature to 1,700° C., generates gases in which the amount of CO is 300 nl/g or smaller and the amount of $CO_2$ is 30 nl/g or smaller.

Figure 1:
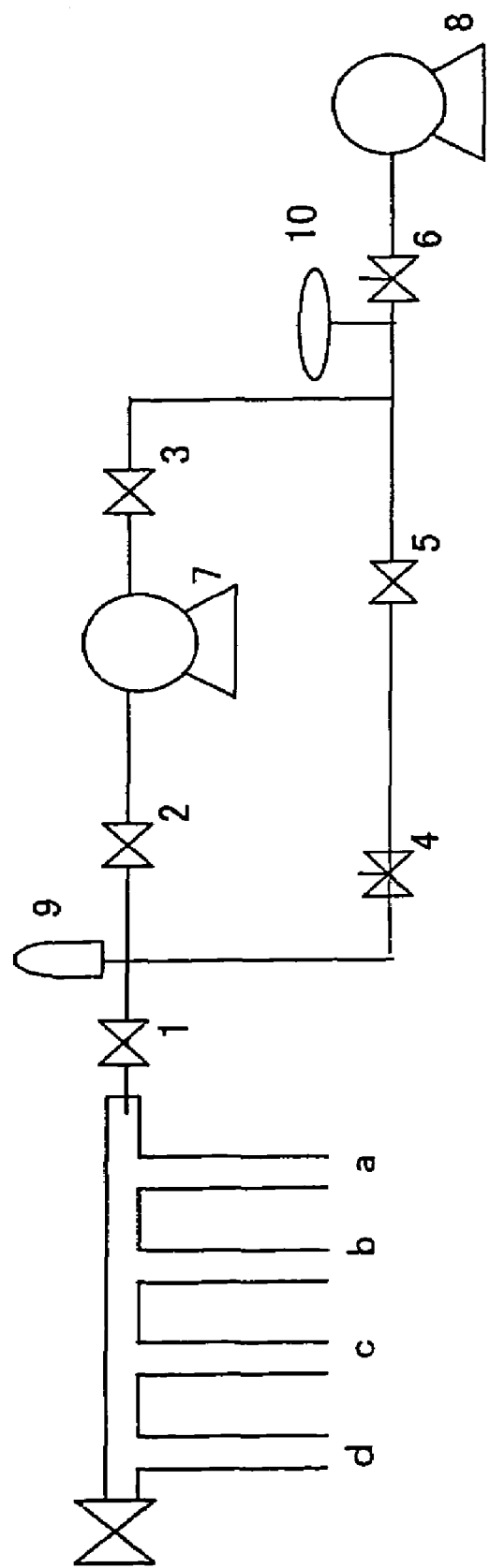
FIG. 1 is a diagrammatic view of an apparatus for producing vacuum glass ampuls.

In the FIGURE, numeral 1 denotes a connection valve, 2 a full evacuation valve, 3 a back pressure valve, 4 a leak valve, 5 a rough evacuation valve, 6 a leak valve, 7 a diffusion pump, 8 a rotary pump, 9 an ionization vacuum gauge, and 10 a Geissler's tube, and symbols a, b, c, and d are glass ampul connection ports.

BEST MODE FOR CARRYING OUT THE INVENTION

The invention will be explained below in detail.

The quartz powder of the invention is a high-purity quartz powder which, upon heating from room temperature to 1,700° C., generates gases, in all of which CO amounts to 300 nl/g or smaller and $CO_2$ amounts to 30 nl/g or smaller. In particular, the quartz powder preferably is one which, upon heating from room temperature to 1,700° C., generates gases, in all of which $N_2$ amounts to 50 nl/g or smaller and $H_2$ amounts to 150 nl/g or smaller.

For determining gases generated by heating the quartz powder, any desired technique among generally known ones can be used. Preferred of these is a technique with which even a gas generated in an exceedingly small amount can be detected and analysis is possible under high-temperature conditions. Examples thereof include TPD-MS (temperature programmed desorption-mass spectroscopy).

In the invention, the gases generated are determined in the following manner. The quartz powder to be analyzed (sample) is placed in a sealed vacuum glass ampul. This ample is heated from room temperature to 1,700° C., and the gases generated during this heating are determined.

The specific procedure is as follows. A quartz powder sample is placed in an ampul made of glass, and the pressure inside the ampul is temporarily regulated to $1.3 \times 10^{-3}$ to $1.3 \times 10^{-4}$ Pa. Subsequently, the sample is heated at 200° C. for 10 minutes and then allowed to stand for 1 hour in order to removed adsorbates including water at an increased rate. After the degree of vacuum in the ampul is ascertained to be kept stable at $1.3 \times 10^{-3}$ to $1.3 \times 10^{-4}$ Pa, the tip is melted to seal the ampul. Thus, a vacuum ampul is produced.

The quartz powder of the invention is characterized in that when the quartz powder is heated from room temperature to 1,700° C., it generates gases, in all of which CO amounts to 300 nl/g or smaller and $CO_2$ amounts to 30 nl/g or smaller. These temperature conditions are preferred because gases can be generated in the maximum amounts while preventing the particles of the quartz powder from sintering.

In the invention, the shorter the time period required for heating the quartz powder from room temperature to the final temperature (heating rate), the better. Specifically, it is preferred that the quartz powder be heated to the final temperature in 10 minutes, preferably in 5 minutes. Such rapid heating is preferred because the determination of the gases generated from the synthetic quartz powder during the rapid heating gives stable results. Too long heating rates may result in fluctuations in determination results.

It is preferred that the quartz powder of the invention have a bulk density of from 1.3 to 1.7 g/cm³ and a metal impurity content of 500 ppb or lower, because this quartz powder gives a glass molding having a further reduced bubble content.

Although the bulk density preferably is 1.3 g/cm³ or higher, too low values thereof may result in a large volume contraction and reduced dimensional stability in melting/molding the quartz powder. On the other hand, there are cases where quartz powders having a bulk density exceeding 1.7 g/cm³ are difficult to produce.

The term metal impurity content as used for the quartz powder of the invention means the content of all metal impurities, which include alkali metals, alkaline earth metals, aluminum, iron, and copper. For determining the content thereof, any desired technique may be used. The content of metal impurities in the quartz powder of the invention is preferably 200 ppb or lower, especially 100 ppb or lower.

For producing the quartz powder of the invention, e.g., the synthetic quartz powder, any desired method may be used. However, it is preferred to produce the powder by the sol-gel method. In particular, it is preferred to produce the powder by a process which comprises hydrolyzing an alkoxysilane to obtain a silica gel having an average particle diameter of from 10 to 500 μm and bringing the silica gel into contact with helium and/or hydrogen gas at a temperature of from 400° C. to 1,300° C.

The average particle diameter of the silica gel to be brought into contact with helium and/or hydrogen gas is preferably from 10 to 500 μm, especially from 100 to 500 μm. When the average particle diameter thereof is too small, gas adsorption or the like is apt to occur because of the increased surface area of the particles. The gas adsorption is causative of bubbles in glass moldings. Conversely, too large average particle diameters may also be causative of bubbles in glass moldings because the efficiency of impurity removal from such particles is low.

The temperature at which the silica gel is contacted with helium and/or hydrogen gas is preferably from 600° C. to 1,300° C., especially preferably from 800° C. to 1,300° C.

The helium and/or hydrogen gas with which the silica gel is contacted preferably is a helium/hydrogen mixed gas containing up to 4% hydrogen. Especially preferably, the silica gel is contacted with pure helium gas. Any desired method may be used for contacting with helium and/or hydrogen gas. Examples thereof include a method in which the gas is passed through the silica gel and a method in which the silica gel is enclosed in a container together with helium and/or hydrogen gas and held therein in an atmosphere of helium and/or hydrogen gas at ordinary or an elevated pressure.

In the production of a synthetic quartz powder by the sol-gel method, the contacting of helium and/or hydrogen gas with the silica gel having an average diameter of from 10 to 500 μm can be conducted at any desired time. For example, use may be made of a method in which the silica gel which has been cooled to room temperature is reheated and contacted with helium and/or hydrogen gas at a temperature of from 400° C. to 1,300° C. or a method in which a silica gel burning step is partly or wholly conducted in a helium and/or hydrogen gas atmosphere. Furthermore, when a synthetic quartz powder obtained as a product through burning is subjected to a heat treatment again, this powder may be contacted with helium and/or hydrogen gas.

Preferred is a method in which the silica gel is heat-treated at 1,000° C. or higher for from 10 to 50 hours in an oxygen-containing atmosphere before or after it is contacted with helium and/or hydrogen gas. The temperature for this heating is preferably not lower than the vitrification temperature, especially preferably not lower than 1,200° C. The time period of this heat treatment conducted under such temperature conditions is preferably from 20 to 40 hours, especially preferably from 25 to 35 hours.

Examples of methods for the heat treatment in an oxygen-containing atmosphere include a method in which the heat treatment is conducted while passing dry air. The time period which should be taken to heat to the heat treatment temperature (heating rate) is not limited. However, the heating rate is generally from 50 to 200° C./hr, preferably from 70 to 150° C./hr.

The above-described heat treatment of the silica gel in an oxygen-containing atmosphere and the contact treatment thereof with helium and/or hydrogen gas at from 400° C. to 1,300° C. may be conducted in any order. It is, however, preferred to conduct the heat treatment in an oxygen-containing atmosphere before the contact treatment with helium and/or hydrogen gas is performed.

The two treatments (the heat treatment in an oxygen-containing atmosphere and the contact treatment with helium and/or hydrogen gas) may be alternately conducted in portions each. For example, a silica gel obtained by the sol-gel method is heated to around 800° C. in a dry air stream and then heated to 1,700° C. in a stream of helium and/or hydrogen gas in place of the dry air. At the time when from 10 to 50% of the first half of the whole period of the heat treatment at the final temperature has passed, the stream is changed to dry air again. The heat treatment is then wholly carried out at the final temperature. At the time when the heating has been completed or immediately before the completion thereof, the stream is changed to helium and/or hydrogen gas again. Thereafter, the stream may be changed to dry air once more.

When the quartz powder of the invention, e.g., the synthetic quartz powder obtained in the manner described above is heated from room temperature to 1,700° C., it generates gases including CO, $CO_2$, $H_2$, and $N_2$ in reduced amounts. Although the reasons for this are unclear, the following is thought. Molecules of a small size, such as helium and hydrogen, sufficiently dissolve in the quartz particles and have a high diffusion velocity. These molecules hence expel gases which have a large molecular size and are especially less apt to diffuse in the particles, e.g., CO, $CO_2$, and $N_2$, from the particles to thereby bring about the reduced gas generation. It is further thought that as a result of the diminution of CO and $CO_2$, the water in the synthetic quartz powder (the water which is generated by an equilibrium reaction between a silanol group ($\equiv$SiOH) and silica ($SiO_2$) in the quartz powder) and the $H_2$ which is generated by an equilibrium reaction among these ($CO + H_2O \leftrightarrows CO_2 + H_2$) are simultaneously diminished.

In the case where the sol-gel method is used in producing the synthetic quartz powder of the invention, the production conditions may be suitably selected as long as a silica gel having an average particle diameter of from 10 to 500 μm obtained by the hydrolysis of an alkoxysilane is brought into contact with helium and/or hydrogen gas at 400° C. to 1,300° C. as described above.

A specific procedure is, for example, as follows. An alkoxysilane and highly pure water are introduced into a reactor. The amount of the pure water to be introduced is from 1 to 10 equivalents to the alkoxysilane. A sol-gel reaction is conducted. Thereafter, the reaction product (wet gel) is pulverized to an average particle diameter of from 10 to 500 μm and dried to obtain a silica gel (dry gel) as a silica precursor. As the alkoxysilane can be used any desired alkoxysilane capable of giving an alkoxysilane oligomer through a hydrolytic poly-condensation reaction, such as tetramethoxysilane, tetraethoxysilane, or the like. Tetraalkoxysilanes are preferred and tetramethoxysilane is especially preferred.

An organic solvent compatible with water, such as an alcohol or ether, may be mixed as a solvent in the hydrolytic condensation reaction. Furthermore, a catalyst such as an acid or alkali may be used in order to accelerate this reaction. Preferred are catalysts containing no metal. In general, an organic acid, ammonia water, or the like is preferred.

The reactor may be heated or cooled in order to control the gelation of the hydrolyzate. The wet gel obtained by this reaction is pulverized so as to have a regulated particle size. The particle size distribution obtained by this pulverization governs the particle size distribution of the synthetic quartz powder as the final product. It is important that the optimal particle size of the wet gel be determined from the target particle size distribution of the product while taking account of the particle contraction to be caused by drying and burning. The silica gel after drying (dry gel) preferably has an average particle diameter of generally from 10 to 500 μm, preferably from 90 to 500 μm, especially from 100 to 500 μm. The degree of drying of the gel is generally from 1 to 30% by weight in terms of water content. Such drying is generally accomplished by heating to 100 to 200° C. at a reduced pressure or in an inert gas atmosphere.

The dry gel thus produced is brought into contact with helium and/or hydrogen gas at a temperature of from 400° C. to 1,300° C. to obtain a high-purity synthetic quartz powder. In general, however, the resultant powder is further burned usually for from 10 to 100 hours at varied temperatures in the range of from 400° C. to 1,250° C. to make the powder particles non-porous. Thus, a high-purity synthetic quartz powder is obtained.

In the invention, a fusion test was conducted in order to ascertain bubble inclusion in a glass molding. Quartz powders are melted by the method of fusion with an oxyhydrogen flame, i.e., Verneuil's method. The bubbles present in each ingot produced are counted. Based on the counts, the powders can be compared in the tendency to generate bubbles.

EXAMPLES

The invention will be explained below in more detail by reference to Examples. However, the invention should not be construed as being limited to the following Examples unless the invention departs from the spirit thereof.

Examples 1-1 and 1-2

Into a mixing vessel were introduced tetrame thoxysilane and water. The amount of the water was 5 equivalents to the silane. The contents were stirred at a temperature of 30° C. for 1 hour to obtain a homogeneous sol solution through a hydrolysis reaction. This solution was transferred to a vat made of poly(vinyl chloride) and allowed to stand for 5 hours to cause it to gel. This gel was dried for 12 hours with a 140° C. vacuum dryer and then subjected to particle size regulation so as to result in an average particle diameter of 320 μm.

One kilogram of the dry gel powder thus obtained was introduced into a lidded container made of quartz glass. This container was set in an electric furnace, and a gas introduction nozzle was inserted into a hole formed in the lid. While dry air was kept being passed, the powder was heated to 1,200° C. at a heating rate of 100° C./hr and held at 1,200° C. for 30 hours to thereby burn the powder. The passing of dry air was continued until the powder cooled sufficiently. Thus, a synthetic quartz powder was obtained.

A 500-g portion of the high-purity synthetic quartz powder obtained was introduced into a lidded container made of quartz glass. This container was set in an electric furnace, and a gas introduction nozzle was inserted into a hole formed in the lid. While helium gas was kept being passed, the powder was heated to 1,200° C. at a heating rate of 400° C./hr and held at 1,200° C. for 10 hours to thereby burn the powder. The passing of helium gas was continued until the powder cooled sufficiently.

A 100-g portion of the helium gas-treated synthetic quartz powder thus obtained was placed in a 100-ml measuring cylinder made of glass to measure the bulk density (tap density) thereof. As a result, the density was found to be 1.34 g/cm$^3$. This synthetic quartz powder was further examined for total metal impurity content. The method of measurement was as follows. First, the synthetic quartz powder was dissolved in high-purity hydrofluoric acid and this solution was heated and evaporated to dryness. Subsequently, this dry solid was dissolved in a 10:1 (by volume) liquid mixture of high-purity dilute nitric acid and high-purity dilute sulfuric acid. The solution thus obtained was examined for metal impurity content by ICP-MASS. As a result, the metal impurity content was found to be about 57 ppb. The content of each metal is shown in Table 2.

TABLE 2

| Kind of metal | Content (ppb) |
| --- | --- |
| Na | 10 |
| K | 2 |
| Ca | 5 |
| Al | 1 |
| Fe | 20 |
| Cu | <0.5 |
| Mn | <0.5 |
| Ti | <1 |
| P | 5 |
| As | 0 |
| B | 3 |
| Ge | 9 |
| U | <0.06 |
| Th | <0.3 |

Subsequently, part of this helium gas-treated synthetic quartz powder was placed in sealed vacuum ampuls by the following method. These ampuls were heated to 1,700° C. at a heating rate of 20° C./min to measure the amounts of gases generated during the heating.

Ampul Production

Test tube type enclosures (eight test tube type enclosures: made of quartz; inner diameter, about 8 mm, thickness, about 1 mm; length, about 130 mm) were washed with a neutral detergent and distilled water. Thereafter, the enclosure tubes were subjected to acetone displacement and dried with nitrogen introduction. A 1.02-g portion was weighed out of the synthetic quartz powder sample obtained by the method described above, and placed in each enclosure tube. The enclosure tube was thinned, with heating with a burner, in a part thereof located about 5 cm apart from the bottom. Thereafter, these enclosure tubes were connected by welding to the glass ports a to d of a vacuum apparatus (MODEL EH-2A, manufactured by TOKUDA) and evacuated. A diagrammatic view of the vacuum melting apparatus is shown in FIG. 1 (ampuls are not shown). As an ionization vacuum gauge was used MODEL HFT-4, manufactured by TOKUDA. Of the four ampuls, the ampuls connected to the glass ports a and b shown in FIG. 1 contained the synthetic quartz powder and the ampuls connected to the glass ports c and d contained nothing so as to serve as blanks.

The rotary pump 8 was operated to reduce the pressure in the system. After the Geissler's tube 10 was ascertained to hardly luminesce, the back pressure valve 3 was opened. At about 15 minutes after the opening of the back pressure valve 3, the diffusion pump 7 began to be operated and an operation for elevating the degree of vacuum was initiated so as to further elevate the degree of vacuum in the system. At 10 minutes after initiation of the operation of the further elevation of the degree of vacuum, the degree of vacuum as measured with the ionization vacuum gauge 9 (TOKUDA MODEL HFT-4) was $5.3 \times 10^{-3}$ Pa.

Subsequently, the ampuls were heated at 200° C. for 10 minutes in order to remove adsorbates including water at an increased rate. At 60 minutes after the initiation, the degree of vacuum was stable at $2.7 \times 10^{-3}$ Pa. The connection valve 1 was closed and the degree of vacuum in the vacuum apparatus system only was ascertained. As a result, no change was observed. The connection valve 1 was opened, and the opening of each ampul was heated with a burner and sealed. These ampuls were separated from the glass ports to produce vacuum glass ampuls. During this operation, the degree of vacuum in the system was stable at $2.7 \times 10^{-3}$ Pa and no change was observed.

Determination of Amounts/Kinds of Gases Generated

A small vacuum/pressurizing furnace (Type: FVPHP-R-5, FRET-35) manufactured by Fuji Denpa Kogyo K. K. and a crucible made of carbon were used. In this crucible were placed the quartz glass ampuls produced by the method described above. These ampuls were heated to 1,700° C. at a rate of 20° C./min and a degree of vacuum of 40 Pa and kept being heated for 20 minutes. After the glass ampuls were cooled and the pressure was returned to ordinary pressure, the ampuls were taken out.

Determination of Gases in Ampuls

The ampuls were set in a fracture vessel which had openings connected to an evacuation pump and a mass spectrometer and the system in which was sealable. The vessel was evacuated with the evacuation pump. Thereafter, the valve disposed at the gate to the mass spectrometer (AGS7000, manufactured by Anerupa K. K.) attached to the fracture vessel was opened. The degree of vacuum in the vessel was further elevated (to $1.3 \times 10^{-3}$ Pa) and this vacuum was maintained for 1 hour or more.

Subsequently, the mass spectrometer was operated at a detector voltage of 2,600 V, and the ampuls were fractured while monitoring m/z of 2 (hydrogen), 4 (helium), 18 (water), 28 (nitrogen and CO), 30 (NO), 32 (oxygen), and 44 (carbon dioxide). The nitrogen and CO were distinguished from each other based on the proportion of m/z=12 to m/z=14.

Gases are discharged from the ampuls to give peaks. The gases generated were determined from the areas of the resultant peaks based on the relative sensitivity ratios to the peaks for standard substances or standard gases.

This determination of gases generated was conducted twice respectively in Examples 1-1 and 1-2. The results are shown in Table 1.

TABLE 1

| | Volume of ampul after heating (cc) | Kind/amount of gas generated (nl/g) | | | | | | |
|---|---|---|---|---|---|---|---|---|
| | | $H_2$ | $H_2O$ | $N_2$ | CO | $O_2$ | $CO_2$ | Total |
| Comparative Example 1 | 7.2 | 177 | 1 | 79 | 388 | 0 | 26 | 670 |
| Example 1-1 | 4.2 | 100 | — | 10 | 160 | 0 | 1 | 271 |
| Example 1-2 | 4.2 | 53 | — | 10 | 133 | 0 | 2 | 198 |
| Comparative Example 2 | 4.1 | 77 | 1 | 16 | 177 | 0 | 4 | 274 |

As apparent from Table 1, the ampuls showed only a slight volume expansion through the heating and gases were generated in reduced amounts. The differences in found values between the two measurements were small, showing that the precision of the analysis was excellent.

Furthermore, the helium gas-treated synthetic quartz powder obtained by the method described above was used to produce an ingot having a diameter of 12 mm and a height of 60 mm using a Verneuil's-method melting apparatus employing an oxyhydrogen flame. In a dark room, this ingot was illuminated by a flashlight, and the bubbles were visually counted through a magnifying lens. As a result, the number of bubbles was as small as 3.

Comparative Example 1

A synthetic quartz powder was obtained in the same manner as in Example 1, except that the treatment with helium gas was omitted. The amounts of the CO, $CO_2$, and other gases generated were determined in the same manner as in Example 1. The results are shown in Table 1.

As apparent from Table 1, the ampuls underwent a large volume expansion through the heating and gases were generated in large amounts.

Furthermore, this synthetic quartz powder was used to produce an ingot in the same manner as in Example 1. This ingot was illuminated by a flashlight in a dark room and the bubbles were counted. As a result, the number of bubbles was as large as 42. It was hence apparent that the quartz powder poses a problem when formed into a glass molding, e.g., a crucible.

Comparative Example 2

A synthetic quartz powder was obtained in the same manner as in Example 1, except that a heat treatment at 1,150° C. was conducted at a degree of vacuum of from 30 to 100 Pa for 8 hours in place of the treatment with helium gas. The amounts of the CO, $CO_2$, and other gases generated were determined in the same manner as in Example 1. The results are shown in Table 1.

Table 1 shows the following. The amounts of the gases generated could be reduced as in the case of the helium gas-treated synthetic quartz powder. However, this method was unsuitable for industrial use because not only the treatment required much time but also it was necessary to keep the inside of the heat treatment apparatus under vacuum conditions.

While the invention has been described in detail and with reference to specific embodiments thereof, it will be apparent to one skilled in the art that various changes and modifications can be made therein without departing from the spirit and scope thereof.

This application is based on a Japanese patent application filed on Jul. 19, 2001 (Application No. 2001-218997), the entire contents thereof being hereby incorporated by reference.

INDUSTRIAL APPLICABILITY

According to the invention, a high-quality synthetic quartz powder reduced in bubble generation upon melting and a glass molding can be obtained.

The glass molding obtained from a melt of the synthetic quartz powder of the invention has high quality with considerably reduced bubble inclusion. The reasons for this are thought to be probably as follows.

To inhibit the formation of black particles has been possible in some degree with a related-art technique which comprises sufficiently passing air or regulating oxygen concentration to thereby accelerate combustion in order to remove the carbon ingredients from scaling debris (abnormal particles) which have come into. However, there is a possibility that carbon compound aggregates which are clusters formed by the partial gathering of carbon ingredients might remain in the quartz powder even though they are not completely carbonized into black particles. It is known that the carbon present in such abnormal particles, which have an increased carbon ingredient concentration, displaces silicon atoms of the silica framework in the synthetic quartz and is thereby incorporated into the framework. The carbon which has been incorporated into the framework is expected to be highly difficult to remove. Vitrification of quartz powders generally requires a temperature as high as 1,700° C. or above. In case where a synthetic quartz powder produced at a lower temperature than that contains residual carbon ingredients which have been incorporated therein, these carbon ingredients are thought to yield CO, $CO_2$, etc. during high-temperature melting to cause bubble inclusion in the glass molding. The gases, such as CO and $CO_2$, released from the quartz powder particles are thought to highly relate to the carbon ingredients contained in the scaling debris in the product. A synthetic quartz powder which generates CO and $CO_2$ in small amounts upon heating to a high temperature is thought to be reduced in the content of carbon ingredients in the scaling debris in the powder and be effective in reducing bubble inclusion in obtaining a glass molding from a melt thereof.

The invention claimed is:

1. A quartz powder which, upon heating from room temperature to 1,700° C., generates gases in which the amount of CO is 300 nl/g or smaller and the amount of $CO_2$ is 30 nl/g or smaller,
   wherein said quartz powder has a bulk density of from 1.3 to 1.7 g/cm$^3$ and a metal impurity content of 500 ppb or lower,
   wherein said quartz powder is a synthetic quartz powder produced by a sol-gel method, which comprises:
   (a) forming a silica gel by a sol-gel method; and
   (b) subjecting said silica gel to a heat treatment in an oxygen-containing atmosphere and subjecting said silica gel to contact with helium gas,
   wherein said subjecting said silica gel to a heat treatment in an oxygen-containing gas is carried out either before or after subjecting said silica gel to contact with helium gas.

2. The quartz powder of claim 1, wherein said silica gel is contacted with helium gas at a temperature of from 400° C. to 1,300° C.

3. The quartz powder of claim 1, wherein said silica gel is subjected to a heat-treated at a temperature of 1,000° C. or higher for from 10 to 50 hours in an oxygen-containing atmosphere.

4. The quartz powder of claim 1, wherein said synthetic quartz powder has a metal impurity content of 200 ppb or lower.

5. The quartz powder of claim 1, wherein said synthetic quartz powder has a metal impurity content of 100 ppb or lower.

6. The quartz powder of claim 1, wherein said silica gel is brought into contact with helium gas at a temperature of from 600° C. to 1,300° C.

7. The quartz powder of claim 1, wherein said silica gel is brought into contact with at least one of helium and hydrogen gas at a temperature of from 800° C. to 1,300° C.

8. The quartz powder of claim 1, wherein said silica gel has an average particle diameter of from 100 to 500 μm.

9. The quartz powder of claim 1, wherein said silica gel is brought into contact with a mixture of helium and hydrogen gas.

10. The quartz powder of claim 9, wherein said mixture of helium and hydrogen gas comprises up to 4% hydrogen.

11. The quartz powder of claim 1, wherein said silica gel is heat-treated at a temperature of 1,200° C. or higher for from 10 to 50 hours in an oxygen-containing atmosphere.

12. The quartz powder of claim 1, wherein said silica gel is heat-treated at a temperature of 1,000° C. or higher for from 20 to 40 hours in an oxygen-containing atmosphere.

13. The quartz powder of claim 1, wherein said silica gel is heat-treated at a temperature of 1,000° C. or higher for from 25 to 35 hours in an oxygen-containing atmosphere.

14. The quartz powder of claim 1, wherein said silica gel is heat-treated at a temperature of 1,000° C. or higher for from 10 to 50 hours in an oxygen-containing atmosphere at a heating rate of 50 to 200° C. per hour.

15. The quartz powder of claim 1, wherein said silica gel is heat-treated at a temperature of 1,000° C. or higher for from 10 to 50 hours in an oxygen-containing atmosphere at a heating rate of 70 to 150° C. per hour.

16. A glass molding, which is produced by melting and molding a quartz powder of claim 1.

\* \* \* \* \*